(12) United States Patent
Johnston et al.

(10) Patent No.: US 8,174,408 B2
(45) Date of Patent: May 8, 2012

(54) METHOD AND SYSTEM FOR THE WIRELESS REMOTE CONTROL OF MARKER LIGHTS

(75) Inventors: Brock Johnston, Brentwood Bay (CA); Jon Bulman-Fleming, Victoria (CA); Allister James Wilmott, Victoria (CA); Timothy R. Ducharme, Victoria (CA); Frederic Anthony Nordstrom, Victoria (CA); Donald Munro Goodeve, Brentwood Bay (CA)

(73) Assignee: Carmanah Technologies Corp., Victoria, British Columbia (CA)

( * ) Notice: Subject to any disclaimer, the term of this patent is extended or adjusted under 35 U.S.C. 154(b) by 569 days.

(21) Appl. No.: 12/296,569

(22) PCT Filed: Apr. 10, 2007

(86) PCT No.: PCT/CA2007/000571
§ 371 (c)(1),
(2), (4) Date: Oct. 9, 2008

(87) PCT Pub. No.: WO2007/115401
PCT Pub. Date: Oct. 18, 2007

(65) Prior Publication Data
US 2009/0058681 A1 Mar. 5, 2009

Related U.S. Application Data

(60) Provisional application No. 60/790,561, filed on Apr. 10, 2006.

(51) Int. Cl.
*G08G 5/00* (2006.01)

(52) U.S. Cl. ........................................ 340/947; 362/555

(58) Field of Classification Search .......... 340/945–948, 340/951–956, 960, 972, 980, 10.32, 10.4; 362/555, 559
See application file for complete search history.

(56) References Cited

U.S. PATENT DOCUMENTS

| | | | |
|---|---|---|---|
| 4,167,783 A | 9/1979 | Mitchell | |
| 5,222,062 A | 6/1993 | Sharma et al. | |
| 5,429,329 A * | 7/1995 | Wallace et al. | 246/166 |
| 5,855,483 A * | 1/1999 | Collins et al. | 434/322 |
| 6,037,721 A | 3/2000 | Lansing et al. | |
| 6,965,205 B2 * | 11/2005 | Piepgras et al. | 315/318 |
| 7,656,308 B2 * | 2/2010 | Atkins | 340/12.3 |
| 2006/0097660 A1 * | 5/2006 | Scott et al. | 315/291 |

FOREIGN PATENT DOCUMENTS

CA 2007978 7/1990

* cited by examiner

*Primary Examiner* — George Bugg
*Assistant Examiner* — Edny Labbees
(74) *Attorney, Agent, or Firm* — Quarles & Brady, LLP; Gavin J. Milczarek-Desai

(57) ABSTRACT

A system for wirelessly controlling marker lights comprising a remote controller comprising a transmitter and one or more marker lights. Each of the marker lights comprise a receiver and processing means, and each of the marker lights have a configuration mode in which the processing means is adapted to cause the receiver to wirelessly receive data from the transmitter. This data comprises one or more group identifiers to assign one or more groups to the marker light. In addition, the processing means of each of the marker lights is adapted to cause the receiver to wirelessly receive one or more commands from the transmitter for controlling the operation of the marker light. The processing means is adapted to carry out the command when the commands comprise the same one or more group identifiers that correspond to the one or more groups to which the marker light was assigned.

25 Claims, 4 Drawing Sheets

METHOD AND SYSTEM FOR THE WIRELESS REMOTE CONTROL OF MARKER LIGHTS

RELATED APPLICATIONS

This application claims priority from U.S. Provisional Patent Application No. 60/790,561 filed Apr. 10, 2006, the contents of which are hereby incorporated by reference.

FIELD OF THE INVENTION

This invention relates to the wireless remote control of marker lights used to illuminate areas such as aircraft runways, airstrips and aircraft landing pads. More specifically, the invention relates to a method and system of wirelessly assigning the marker lights to separate groups and wirelessly controlling the operation of these groups of marker lights.

BACKGROUND OF THE INVENTION

Airfields are equipped with various types of lighting to guide aircraft during taxiing, take-off, and landing procedures. Several types of marker lights (e.g. runway edge lights, threshold lights, taxiway lights, etc.) are typically used, each with their own unique purpose. The marker lights may be grouped according to their location on the airfield and/or their purpose. The marker lights may also be portable, in that they may be moved from one location to another as circumstances warrant. The control of each group of marker lights may be handled by the control tower, which has the means to turn the marker lights on or off or to adjust the lights' intensity. Traditionally, this was accomplished by running wires from each group of marker lights to a central controller containing relays to control the power to each group of marker lights. Alternatively, each group of marker lights may be controlled by a local power relay, which in turn is remotely controlled using wires that run from the local power relay to a central controller. A disadvantage to these approaches is that multiple control and/or power cables from the marker lights to the controller are required. It may also be necessary to construct trenches in the ground to carry the cables from the marker lights to the controller.

Furthermore, some marker lights may need to be configured to illuminate sequentially or in some other pre-arranged order. For example, the marker lights may be required to illuminate in a sequence starting from the approach end of the airstrip and progressing toward the opposite end of the airstrip. This operation requires that the marker lights be controlled either individually or small groups, with each comprising one or more adjacent marker lights.

In certain applications, such as in remote or temporary airfields, the cost and/or time required to install the necessary wiring may be prohibitive. In some cases, installation costs may be reduced by using solar-powered marker lights. U.S. Pat. No. 6,573,659 to Toma et al., the contents of which are incorporated herein by reference, describes one such solar-powered lighting system. Although the use of a solar-powered lighting system would eliminate the need for power cables, cables would still be needed to transmit the control signals from the controller to the marker lights.

Controlling the operation of different groups of marker lights is especially difficult using portable marker lights. One approach is to pre-program each marker light with a specific group identity, which allows each marker light to be assigned as being a member of a specific group. However, there are several disadvantages with using pre-programmed group identities. First, after the group identities have been assigned to the marker lights, care must be taken during deployment to ensure that the marker lights corresponding to each group are placed in their correct locations. Second, since the group identities are pre-programmed, the number of marker lights in each group is pre-determined, thereby limiting flexibility during deployment.

In some deployment scenarios, such as in temporary airstrips, it is imperative to have rapid and straightforward deployment of marker lights, along with flexibility in the assignment of each marker light to one or more groups.

It is an object of the present invention to provide a method and system for assigning marker lights to separate groups and controlling their operation that overcomes the aforementioned disadvantages.

The objects of the invention will be better understood by reference to the detailed description of the preferred embodiment that follows.

SUMMARY OF THE INVENTION

The present invention provides a system for wirelessly controlling marker lights comprising a remote controller comprising a transmitter and one or more marker lights. Each of the marker lights comprise a receiver and processing means, and each of the marker lights have a configuration mode in which the processing means is adapted to cause the receiver to wirelessly receive data from the transmitter. This data comprises one or more group identifiers to assign one or more groups to the marker light. In addition, the processing means of each of the marker lights is adapted to cause the receiver to wirelessly receive one or more commands from the transmitter for controlling the operation of the marker light. The processing means is adapted to carry out the command when the commands comprise the same one or more group identifiers that correspond to the one or more groups to which the marker light was assigned.

The present invention also provides for a method of wirelessly controlling a plurality of marker lights. The steps of the method comprise each of one or more of the marker lights being placed into a configuration mode, and each of the one or more of the marker lights wirelessly receiving data from a remote controller, with the data comprising one or more group identifiers to assign one or more groups to each of the one or more of the marker lights. Then, the remote controller wirelessly transmits to the marker lights one or more commands to control the operation of the marker lights. Each of the one or more of the marker lights carries out the commands when the commands comprise the same one or more group identifiers that correspond to the one or more groups to which each of the one or more of the marker lights was assigned.

The foregoing was intended as a broad summary only and of only some of the aspects of the invention. It was not intended to define the limits or requirements of the invention. Other aspects of the invention will be appreciated by reference to the detailed description of the preferred embodiment and to the claims.

BRIEF DESCRIPTION OF THE DRAWINGS

The invention will be described by reference to the detailed description of the preferred embodiment and to the drawings thereof in which.

DETAILED DESCRIPTION OF THE PREFERRED EMBODIMENT

According to one embodiment of the present invention, there is provided a system for wirelessly assigning marker lights to one or more groups and for wirelessly controlling their operation. The system comprises one or more marker lights 5 and a remote controller 6.

Figure 1:
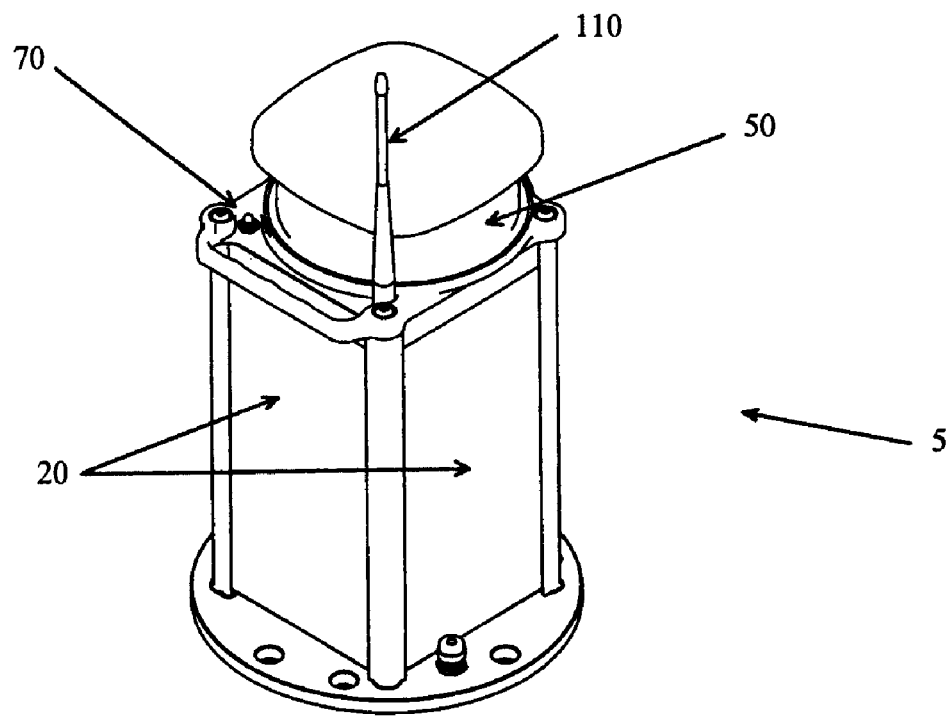
FIG. 1 is a perspective view of a marker light in accordance with one embodiment of the present invention.
Figure 3:
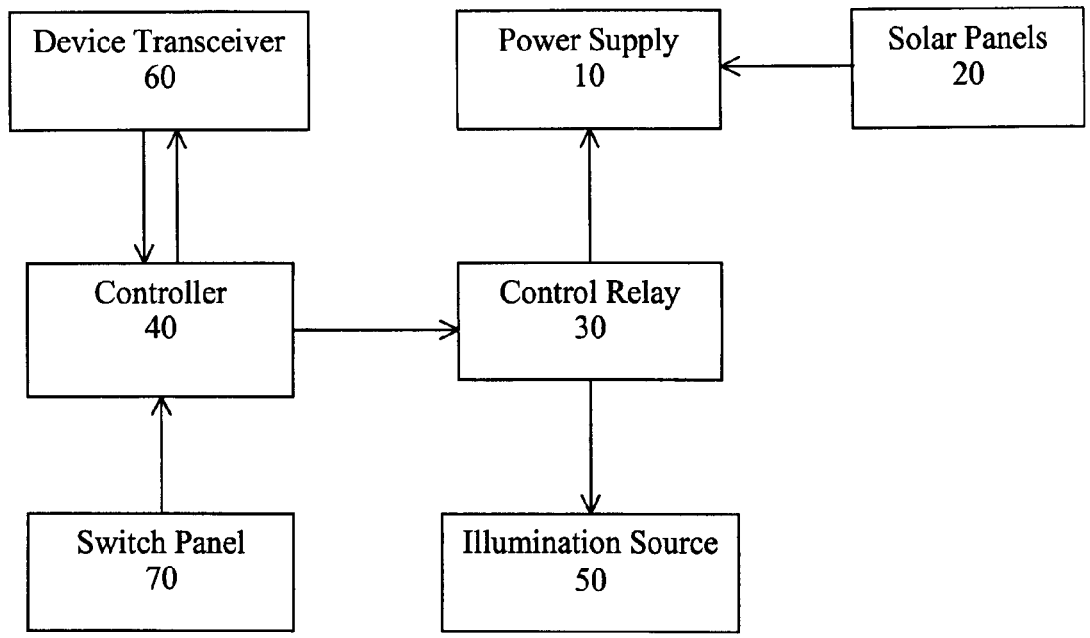
FIG. 3 is a block diagram showing the components of the marker light in accordance with one embodiment of the present invention.

Referring to FIGS. 1 and 3, the marker light 5 in accordance with one embodiment comprises a power supply 10 that supplies electrical power to operate an illumination source 50. The power supply 10 may comprise sealed lead-acid batteries that are charged using a synchronous buck regulator with energy supplied by one or more solar panels 20 or from some other external power source, such as an external power supply. The synchronous buck regulator may comprise a National Semiconductor LM27222 synchronous MOSFET driver. Alternatively, instead of using batteries, the power supply 10 may use electrical power supplied by AC mains.

A control relay 30 controls the power that flows from the power supply 10 to the illumination source 50. The control relay 30 comprises one or more electrical relays, solid-state switches (such as field-effect transistors), or power supplies. In another embodiment, the control relay 30 comprises one or more switching regulators, such as Linear Technologies LTC1871 switching regulators.

The illumination source 50 comprises one or more visible, near-infrared, or far-infrared light sources that provide the light emanating from the marker light. An example of a suitable visible light source is a Luxeon emitter manufactured by Philips Lumileds Lighting Company. An example of a suitable near-infrared light source is the TOP IR LED (model SMT870N) manufactured by Epitex Inc. If the illumination source 50 comprises more than one light source, such as, for example, one visible light source and one near-infrared light source, then more than one switching regulator may be present in the control relay 30. This allows each light source to be controlled by a separate switching regulator in the control relay 30.

The marker light 5 further comprises processing means, such as provided by a controller 40. The controller 40 controls the operation of the marker light 5 and may comprise memory and a microcontroller for signal conditioning and interfacing to other components of the marker light. One such microcontroller is the Texas Instrument MSP430F149, although other suitable microcontrollers may also be used. In addition to controlling the control relay 30, the microcontroller also monitors system conditions such as battery voltage and responds to signals from the other components of the marker light 5.

The controller 40 is connected to a device transceiver 60 for communicating wirelessly with the remote controller 6. In another embodiment, the device transceiver 60 may instead be a receiver capable of only receiving wireless signals. One example of a suitable device transceiver 60 is the MaxStream 9Xtend 900 MHz modem, which is able to transmit and receive within the 900 MHz frequency band. Others may be used, including those that operate at different radio frequencies, such as 2.4 GHz and 868 MHz, and those that transmit and receive other electromagnetic signals, including infrared. The device transceiver 60 may be connected to an antenna 110.

The controller 40 is also connected to a switch panel 70. The switch panel 70 may comprise one or more pushbutton switches or other suitable switch mechanisms. When the appropriate switch or switches in the switch panel 70 are engaged, such as by depressing one or more pushbutton switches, the controller 40 enters into a state called a "configuration mode" for a preset period of time. In one embodiment, this period of time is 5 minutes. While in this state, the controller 40 causes the device transceiver 60 to await for a group assignment command from the remote controller 6. A group assignment command is a wireless signal instructing the controller 40 that its respective marker light 5 belongs to a specific group and comprises data in the form of a group identifier. This data is then stored in the memory of the controller 40.

By providing for the capability of the controller 40 to enter into the "configuration mode" through the engaging of the switch or switches in the switch panel 70, the marker light 5 can be assigned to a group through wireless communication either before or after physical deployment of the marker light 5.

In one embodiment, the controller 40 exits the "configuration mode" when the preset period of time has elapsed or when a group assignment command has been received. In the event that no group assignment command is received before the preset period of time elapses, the group identifier data previously in the memory is retained and the marker light 5 remains in the group that it was in previously. By default, the marker light 5 is initially given the factory setting of being in "Group 1".

In another embodiment, the controller 40 will not exit the "configuration mode" when a group assignment command is received; instead, additional group assignment commands may be received, but with only one group identifier data being ultimately retained. For example, the controller 40 may retain only the most recent group assignment command received. In a further embodiment, the controller 40 may be capable of storing multiple group identifier data in its memory. In such a case, the device transceiver 60 will continue to receive group assignment commands and the controller 40 will store all group identifier data received while in the "configuration mode".

If the controller 40 is not in "configuration mode", the marker light 5 will ignore any group assignment commands sent by the remote controller 6.

The switch panel 70 may comprise additional switches to allow for the marker light 5 to be turned on and off and for the intensity of the illumination source 50 to be adjusted.

The device transceiver 60 of the marker light 5 is able to receive wireless operation commands from the remote controller 6 as well, whether the controller 40 is in "configuration mode" or not. An operation command is a wireless signal that carries one or more group identifiers along with one or more instructions. If the group identifier(s) carried in the operation command match the group identifier data in the memory of the controller 40, then the controller 40 performs the actions specified in the instruction(s). These instructions may include instructions to turn on or off the illumination source 50 or to vary the intensity of the light from the illumination source 50.

If the group identifier(s) carried in the operation command do not match the group identifier data in the memory of the controller 40, then the controller 40 disregards the instructions.

Figure 2:
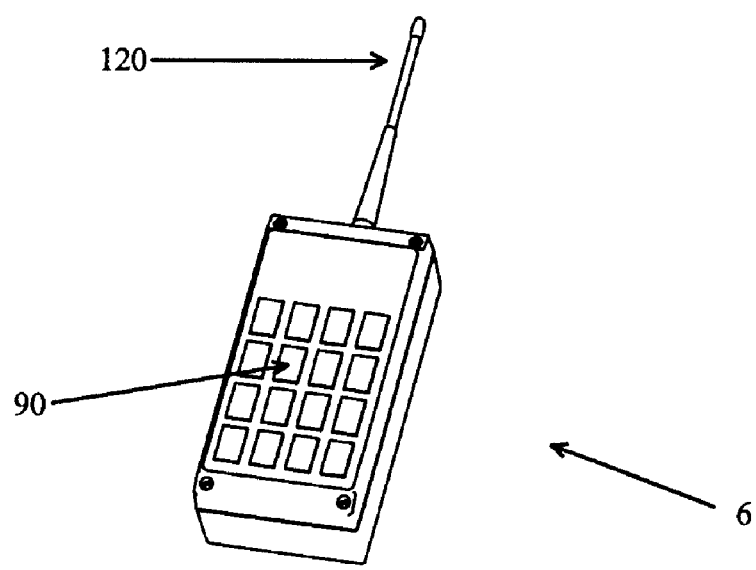
FIG. 2 is a perspective view of a remote controller in accordance with one embodiment of the present invention.
Figure 4:
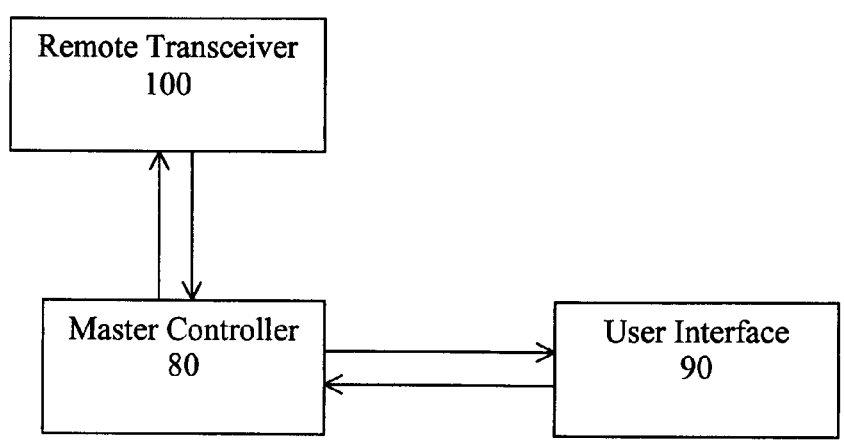
FIG. 4 is a block diagram showing the components of the remote controller in accordance with one embodiment of the present invention.

Referring to FIGS. 2 and 4, the remote controller 6 in accordance with one embodiment comprises a central transceiver 100 that communicates wirelessly with the transceivers 60 of the marker lights 5. The central transceiver 10 is connected to a master controller 80 that controls the operation of the remote controller 6 and may comprise a microcontroller for signal conditioning and interfacing to other components of the remote controller 6. One such microcontroller is the Texas Instrument MSP430F149, although other suitable microcontrollers may also be used. The master controller 80 accepts input from and displays information to a user interface 90 and controls the communication of wireless signals to the marker lights 5 via the central transceiver 100.

The remote controller 6 may be handheld and carried around, or it may be placed in a fixed location.

The user interface 90 may comprise various buttons or switches that may be manipulated by a user, along with indicator displays to various statuses of the system. Alternatively, the user interface 90 may comprise a display device, such as a monitor, with input from the user being entered through a keyboard or a mouse. Through the user interface 90, the user may direct the master controller 80 to cause the central transceiver 100 to transmit group assignment commands or operation commands.

The central transceiver 100 is able to communicate wirelessly with the device transceivers 60 of the marker lights 5. In another embodiment, the central transceiver 100 may instead be a transmitter capable of only transmitting wireless signals. One example of a suitable central transceiver 100 is the MaxStream 9Xtend 900 MHz modem, which is able to transmit and receive within the 900 MHz frequency band. Others may be used, including those that operate at different radio frequencies, such as 2.4 GHz and 868 MHz, and those that transmit and receive other electromagnetic signals, including infrared. The central transceiver 100 may be connected to an antenna 120.

Figure 5:
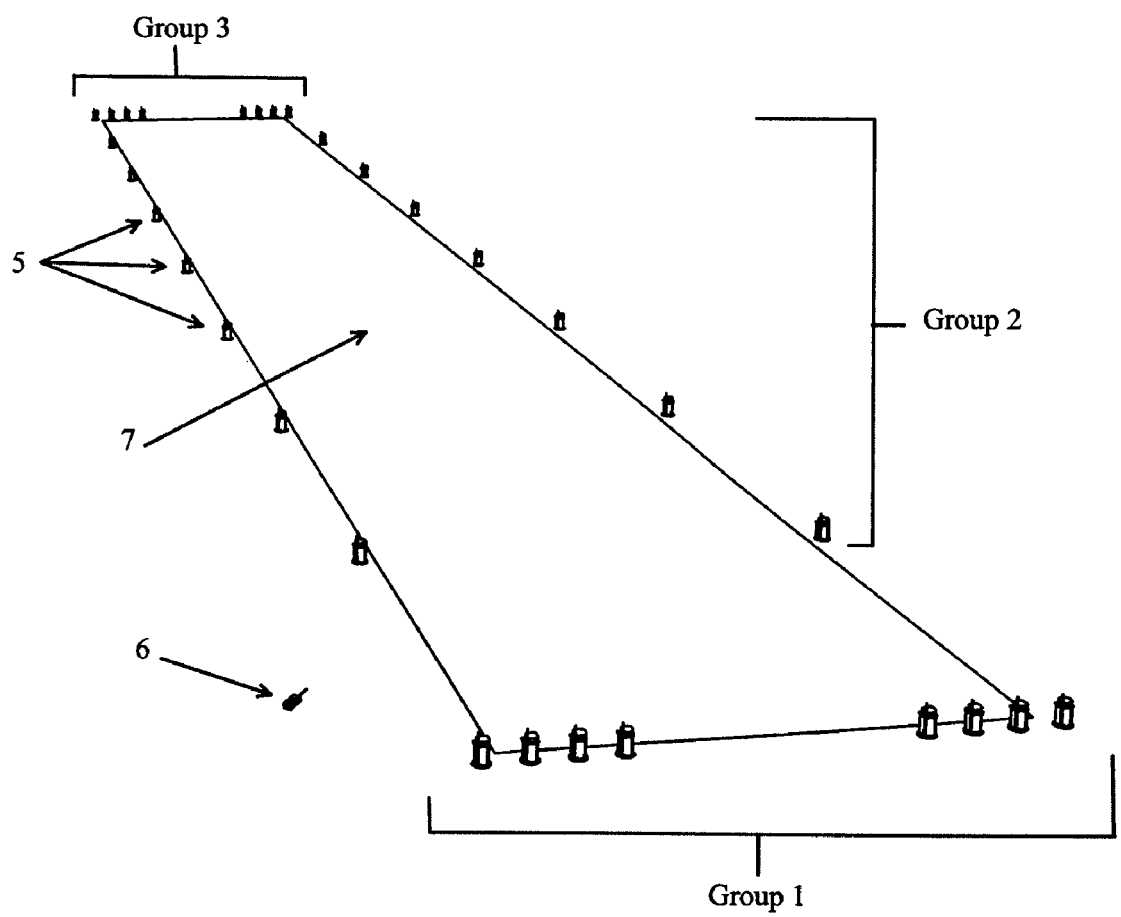
FIG. 5 is a diagram showing a sample deployment of marker lights in accordance with one embodiment of the present invention.
Figure 6:
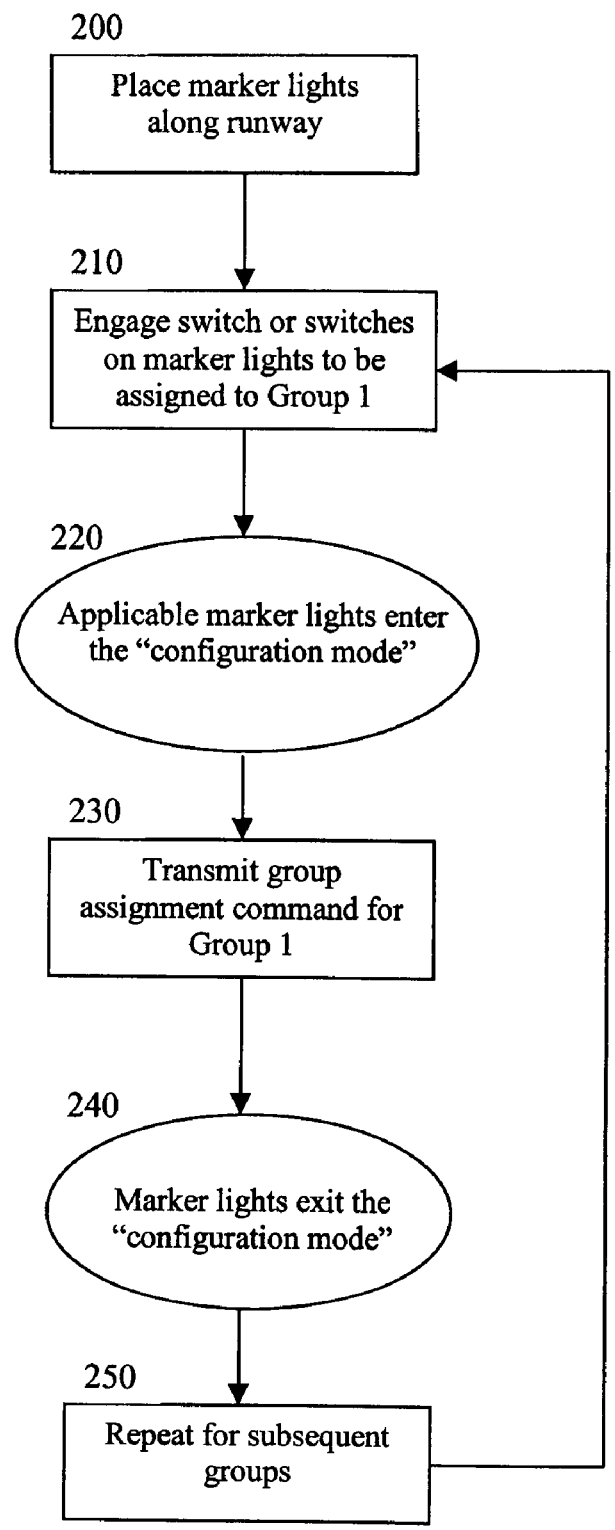
FIG. 6 is a flowchart showing the sequence of steps involved in a sample deployment of marker lights in accordance with one embodiment of the present invention.

Referring to FIGS. 5 and 6, an example of the deployment of marker lights in accordance with the present invention is depicted. Marker lights 5 are initially placed (200) at the desired locations along a runway 7 or in some other appropriate area. At this stage, it is not necessary to differentiate among the individual marker lights 5, even if they are intended to be in different groups. After the marker lights 5 have been placed, the marker lights 5 can then be assigned to their respective groups (shown in FIG. 5 as Groups 1, 2, and 3). To accomplish this, the appropriate switch or switches on the switch panel 70 for each of the marker lights 5 to be assigned to Group 1 are engaged (210). In this example, this corresponds to the marker lights 5 along the bottom edge of the runway 7. This causes those marker lights 5 to enter into the "configuration mode" (220).

Through the user interface 90, the remote controller 6 can then be instructed to send (230) a group assignment command with group identifier data identifying that group as being Group 1. Those marker lights 5 currently in the "configuration mode" (i.e. the marker lights 5 along with bottom edge of the runway 7) receives this group assignment command, and their respective controllers 40 stores the group identifier data (identifying them as being in Group 1) in their memory. As the other marker lights 5 are not in the "configuration mode", those marker lights 5 will ignore the group assignment command. In one embodiment, after the group assignment command has been received, the controllers 40 for those marker lights 5 exit the "configuration mode" (240).

Next, the second group of marker lights is assigned by engaging the appropriate switch or switches in the switch panel 70 for each of the marker lights 5 to be assigned to Group 2. In this example, the marker lights 5 along the longitudinal edges of the runway 7 will enter the "configuration mode". The remote controller 6 then sends a group assignment command with group identifier data identifying the group as being in Group 2. The marker lights 5 that are in the "configuration mode" receive the group assignment command and stores the group identifier data in their memory. Subsequent groups (e.g. Group 3) can be assigned by repeating (250) the procedure, except that the appropriate group identifier data for that group is used instead. It can be seen that a number of marker lights 5 can be quickly deployed initially without regard for their membership in any particular group since each marker light 5 can be assigned to any group afterwards.

After the marker lights 5 have been assigned to their appropriate groups, the operation of the marker lights for a particular group (including turning them on or off or adjusting their intensity) can be controlled by the remote controller 6 transmitting an operation command carrying the group identifier data corresponding to that particular group.

In another example, the marker lights 5 may be assigned to their respective groups before they are physically deployed. For instance, a plan for the arrangement of marker lights 5 on a runway 7 may be drawn up beforehand, indicating the necessary groupings of marker lights 5. The first group of marker lights 5 is assigned by engaging the appropriate switch or switches in the switch panel 70 for each of the marker lights 5 in the first group and then instructing the remote controller 6 to send a group assignment command with group identifier data identifying that group as being the first group. As a result, these marker lights 5 have now been assigned as being in the first group and they can now be appropriately deployed. The remaining marker lights 5 can be assigned in a similar manner.

In another embodiment of the present invention, the marker lights 5 in a particular group of lights may be configured to illuminate sequentially within that group. To create a sequence in a group, the remote controller 6 is put into the "sequence configuration mode" by entering the appropriate instructions in the user interface 90. The remote controller then instructs the central transceiver 100 to transmit a wireless command alerting all marker lights 5 in that group to wait for a sequence assignment command. At this point, an appropriate switch or switches are engaged in the switch panel 70 of first marker light that is to illuminate in the sequence. When the switch or switches are engaged on the first marker light, the controller 40 for that marker light instructs the transceiver 60 to communicate with the central transceiver 100 of the remote controller to determine the sequence number for that marker light. In this example, as it is first marker light in the sequence, the first marker light is given the sequence number of 1 by the master controller 80 of the remote controller 6. This sequence number is wirelessly transmitted by the central transceiver 100 to the transceiver 60 and stored in the memory of the controller 40. The sequence number is then incremented by one in the master controller 80.

An appropriate switch or switches are then engaged in switch panel 70 of the second marker light that is to illuminate. The controller 40 for the second marker light instructs the transceiver 60 to communicate wirelessly with the central transceiver 100 of the remote controller 6 to determine the sequence number for that marker light. The master controller 80 if the remote controller 6 causes the central transceiver 100 to wirelessly transmit the current sequence number (now 2) to the transceiver 60 of the second marker light and it is stored in the memory of the controller 40. The sequence number is again incremented by one in the master controller 80. This process is then repeated for the remaining lights in the sequence.

When it is time for the marker lights 5 in the group to illuminate sequentially (e.g. by engaging the appropriate instructions through the user interface 90 of the remote controller 6 and the wireless transmission of those instructions to the marker lights 5), the marker lights 5 will be aware of their place in the sequence and can therefore illuminate at the correct time in the sequence.

By providing for the wireless assignment of marker lights into groups and the wireless control of those marker lights, the need for costly trenching to accommodate wires is eliminated.

The present invention can also be used in other applications besides in airstrips or landing pads. It may be used in any application wherein the operation of individual lights (or groups of lights) must be controlled independently of other individual lights (or groups of lights).

It will be appreciated that the preferred embodiment has been described for the purpose of illustrating the principles of the invention and variations to the preferred embodiment may be practiced without departing from those principles as reflected herein and in the claims.

What is claimed:

1. A system for wirelessly controlling marker lights comprising:
    a remote controller comprising a transmitter,
    a plurality of marker lights, each said marker light comprising a receiver and a processor, and each said marker light having a configuration mode, wherein upon entry into said configuration mode, said processor is adapted to cause said receiver to wirelessly receive configuration data from said transmitter, said configuration data comprising one or more group identifiers to assign one or more groups to each said marker light and wherein upon exit from said configuration mode, said processor is adapted to cause said receiver to cease accepting said configuration data, and
    wherein said processor of each said marker light is adapted to cause said receiver to wirelessly receive one or more commands from said transmitter for controlling the operation of said marker light, and said processor is adapted to carry out said commands when said commands comprise the same one or more group identifiers that correspond to said one or more groups to which said marker light was assigned.

2. The system of claim 1, wherein each said marker light further comprises a switch to control said configuration mode.

3. The system of claim 2, wherein said switch is adapted to allow for entry into said configuration mode.

4. The system of claim 2, wherein said switch is a pushbutton.

5. The system of claim 1, wherein each said marker light is adapted to exit from said configuration mode after the earlier of:
    the lapse of a preset interval of time after entering said configuration mode, and
    said receiver receiving one of said group identifiers.

6. The system of claim 5, wherein said preset interval of time is 5 minutes.

7. The system of claim 1, wherein each said marker light further comprises a power supply.

8. The system of claim 7, wherein said power supply comprises one or more batteries.

9. The system of claim 8, wherein said one or more batteries are charged by energy collected by one or more solar panels.

10. The system of claim 1, wherein each said marker light comprises an illumination source.

11. The system of claim 10, wherein said illumination source comprises one or more of the following light sources: visible light source, near-infrared light source, and far-infrared light source.

12. The system of claim 10, wherein each said marker light further comprises switch means to control the intensity of light emitted by said illumination source.

13. A system for wirelessly controlling marker lights comprising:
    a remote controller comprising a transmitter,
    a plurality of marker lights, each said marker light comprising a transceiver and a processor, and each said marker light having a configuration mode, wherein upon entry into said configuration mode, said processor is adapted to cause said transceiver to wirelessly receive configuration data from said transmitter, said configuration data comprising one or more group identifiers to assign one or more groups to each said marker light and wherein upon exit from said configuration mode, said processor is adapted to cause said transceiver to cease accepting said configuration data, and
    wherein said processor of each said marker light is adapted to cause said transceiver to wirelessly receive one or more commands from said transmitter for controlling the operation of said marker light, and said processor is adapted to carry out said commands when said commands comprise the same one or more group identifiers that correspond to said one or more groups to which said marker light was assigned.

14. The system of claim 13, wherein each said marker light further comprises a switch to control said configuration mode.

15. The system of claim 14, wherein said switch is adapted to allow for entry into said configuration mode.

16. The system of claim 14, wherein said switch is a pushbutton.

17. The system of claim 13, wherein each said marker light is adapted to exit from said configuration mode after the earlier of:
    the lapse of a preset interval of time after entering said configuration mode, and said transceiver receiving one of said group identifiers.

18. A system for wirelessly controlling marker lights comprising:
    a remote controller comprising a central transceiver,
    a plurality of marker lights, each said marker light comprising a transceiver and a processor, and each said marker light having a configuration mode, wherein upon entry into said configuration mode, said processor is adapted to cause said transceiver to wirelessly receive configuration data from said central transceiver, said configuration data comprising one or more group identifiers to assign one or more groups to each said marker light and wherein upon exit from said configuration mode, said processor is adapted to cause said transceiver to cease accepting said configuration data, and
    wherein said processor of each said marker light is adapted to cause said transceiver to wirelessly receive one or more commands from said central transceiver for controlling the operation of said marker light, and said processor is adapted to carry out said commands when said commands comprise the same one or more group identifiers that correspond to said one or more groups to which said marker light was assigned.

19. A method of wirelessly controlling a marker light, the method comprising the steps of:
   said marker light being placed into a configuration mode, in which said marker light commences wirelessly receiving configuration data from a remote controller, said configuration data comprising one or more group identifiers to assign one or more groups to said marker light;
   said marker light exiting said configuration mode, in which said marker light ceases accepting said configuration data
   said remote controller wirelessly transmitting to said marker light one or more commands to control the operation of said marker light; and
   said marker light carrying out said commands when said commands comprise the same one or more group identifiers that correspond to said one or more groups to which said marker light was assigned.

20. The method of claim 19, wherein the step of said marker light exiting said configuration mode occurs after the earlier of:
   the lapsing of a preset interval of time after said marker light entering said configuration mode, and
   said marker light receiving one of said group identifiers.

21. The method of claim 20, wherein said preset interval of time is 5 minutes.

22. A method of wirelessly controlling a plurality of marker lights, the method comprising the steps of:
   each of said plurality of marker lights being placed into a configuration mode, in which each of said plurality of marker lights commences wirelessly receiving configuration data from a remote controller, said configuration data comprising one or more group identifiers to assign one or more groups to each of said plurality of marker lights;
   each of said plurality of marker lights exiting said configuration mode, in which each of said plurality of marker lights ceases accepting said configuration data
   said remote controller wirelessly transmitting to said marker lights one or more commands to control the operation of said marker lights; and
   each of said plurality of marker lights carrying out said commands when said commands comprise the same one or more group identifiers that correspond to said one or more groups to which each of said plurality of marker lights was assigned.

23. The method of claim 22, wherein the step of each of said plurality of marker lights exiting said configuration mode occurs after the earlier of:
   the lapsing of a preset interval of time after each of said plurality of marker lights entering said configuration mode, and
   each of said plurality of marker lights receiving one of said group identifiers.

24. The method of claim 23, wherein said preset interval of time is 5 minutes.

25. A method of wirelessly assigning a sequence to a plurality of marker lights, the method comprising the steps of:
   a first marker light transmitting a sequence number identification request to a remote controller;
   said remote controller transmitting a sequence number to said first marker light;
   said remote controller incrementing said sequence number; and
   each of one or more subsequent marker lights consecutively performing the steps of:
      each subsequent marker light transmitting a sequence number identification request to said remote controller;
      said remote controller transmitting a sequence number to said each subsequent marker light; and
      said remote controller incrementing said sequence number.

* * * * *